April 22, 1941.   R. H. DALTON ET AL   2,239,551
METHOD OF MAKING SEALING GLASSES AND SEALS FOR QUARTZ LAMPS
Filed April 22, 1939
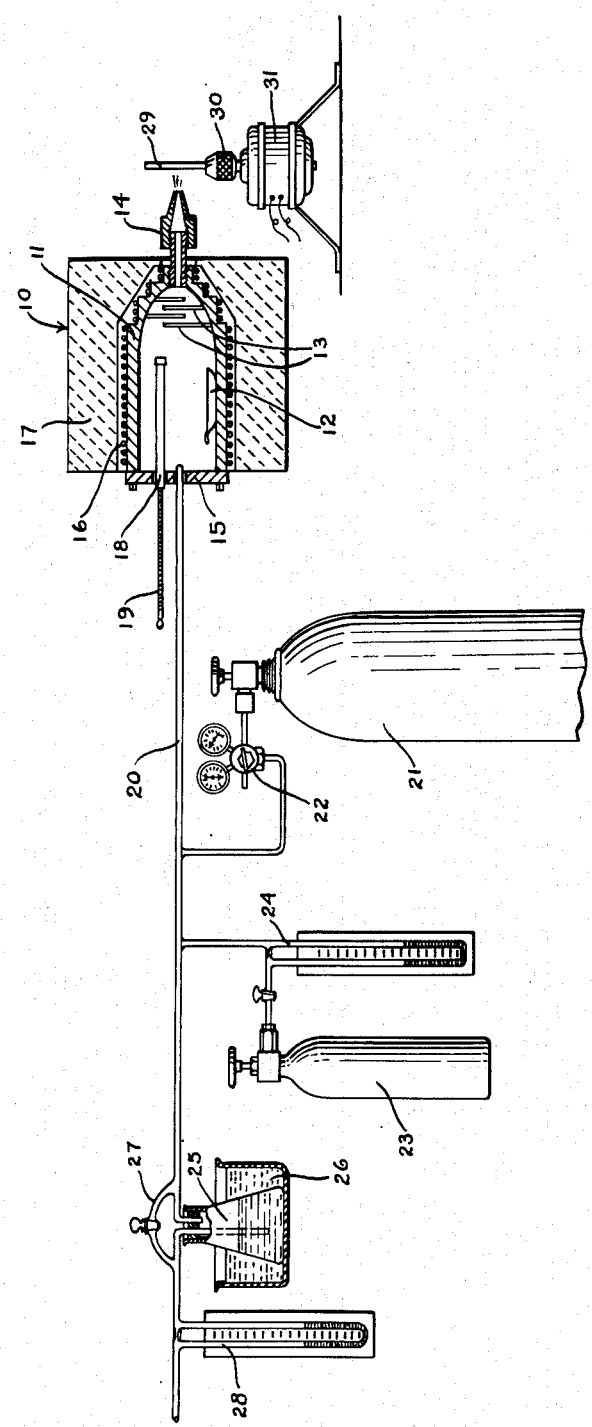
INVENTORS.
ROBERT H. DALTON
AND MARTIN E. NORDBERG
BY
ATTORNEY.

Patented Apr. 22, 1941

2,239,551

UNITED STATES PATENT OFFICE 2,239,551

METHOD OF MAKING SEALING GLASSES AND SEALS FOR QUARTZ LAMPS

Robert H. Dalton and Martin E. Nordberg, Corning, N. Y., assignors to Corning Glass Works, Corning, N. Y., a corporation of New York Application April 22, 1939, Serial No. 269,496

14 Claims. (Cl. 49—79)

This invention relates to glass and has for its primary object a simple method of making glasses of high melting point and low expansion coefficient which are very difficult to melt and fine by ordinary methods of melting.

Another object is to coat a lead-in wire with one or more glasses which will form a graded seal between the metal and silica, thereby facilitating the sealing of lead-in wires to quartz envelopes in the fabrication of electric discharge tubes and the like.

To these and other ends the invention comprises decomposing a gaseous mixture of glass-forming compounds in a flame of combustible gas and vitrifying the resultant mixture of finely divided oxides.

More specifically, the invention comprises passing through a high temperature flame a gaseous mixture containing decomposable compounds of silicon, boron and aluminum in predetermined proportions and depositing and vitrifying the resultant mixture of oxides.

The invention further consists in a graded seal between glass and metal in which the expansion coefficient of the glass is substantially the same as that of the metal where it contacts the metal but varies regularly and continuously to a substantially different value at a distance from the metal.

Our invention is particularly useful in the fabrication of the so-called high pressure mercury arc lamps. These lamps operate at high temperatures and the envelopes thereof must be composed of pure silica or a glass of similarly high melting point in order to retain their shape under operating conditions. Such envelopes have very low coefficients of expansion, that of silica being about $5.5 \times 10^{-7}$, which is far below the expansion coefficients of the metals commonly used for the leading-in wires. It is therefore necessary to use a graded seal comprising one or more glasses having intermediate expansion coefficients in order to form successful seals between the envelope and its lead-in wires. The intermediate glasses must be substantially free from alkali and are composed largely of silica, boric oxide and alumina in order to maintain the low expansions required. These are very hard glasses which are difficult and expensive to melt and work and may be produced only in small quantities at a time. It has been found advantageous heretofore to apply a coating of the intermediate glass to the lead-in wire before inserting the latter into the wall of the envelope. The application of these glass coatings to the lead-in wires is difficult and requires great skill. It is usually accomplished by spinning a thread of the previously compounded glass around the wire and fusing it in place.

We have discovered that suitable intermediate sealing glasses may be compounded and melted by a simple method and that the compounded glasses, if desired, may at the same time be applied to the lead-in wires, thus providing a method of fabricating a glass of high melting point and a lead-in wire coated therewith by a single operation.

In the accompanying drawing, which illustrates the invention in its preferred embodiment, there is represented a side view partly in section of an apparatus for compounding and applying glass coatings to lead-in wires.

In the drawing a burner generally designated 10 comprises a cylindrical metal barrel 11, within which are disposed a refractory boat 12 and baffles 13. The barrel 11 is provided at one end with a burner tip 14 and at the other end with a removable cover plate 15 and is surrounded by a heating element 16 and refractory insulation 17. Through the plate 15 a metal tube 18 containing a thermometer 19 projects into the barrel 11 and is closed at its inwardly projecting end. A supply tube 20 extending through the plate 15 and communicating with the interior of the barrel 11 is connected consecutively, as shown, with an oxygen tank 21 provided with a reducing valve 22, a tank 23 of boron fluoride gas provided with a flow-meter 24 and a flask 25 containing silicon tetrachloride and supported in a constant temperature bath 26. The flask 25 is provided with a by-pass 27 and is connected to a source of combustible gas, such as natural gas (not shown), through a flow-meter 28. In front of the burner tip 14 a lead-in wire 29 to be treated is held by a rotatable chuck 30 which in the present embodiment is attached to the shaft of an electric motor 31 but may be supported and rotated by any suitable means.

In practicing the invention, a quantity of aluminum chloride, preferably anhydrous, is placed in the boat 12 of the burner 10 and the barrel 11 is tightly closed by the plate 15. A suitable flow of combustible gas is passed through the by-pass 27 into the burner 10 and ignited at the tip 14. The required amount of oxygen is admitted to produce a small high temperature flame. The compounds to be decomposed, vitrified and deposited upon the lead-in wire 29 are introduced into the gas stream as follows: By wholly or partially closing the by-pass 27, the stream of combustible gas is forced wholly or in part through the flask 25 whereby some of the silicon tetrachloride contained therein is vaporized into the gas stream. The amount thus vaporized may be controlled by adjusting the amount of combustible gas passed through the flask and also by maintaining the bath 26 at a temperature which will cause greater or less evaporation. If desired, the silicon chloride alternatively may be introduced through a flowmeter from an ordinary steel bottle provided with a valve and heated sufficiently to produce internal pressure. By means of the flow-meter 24 a measured amount of boron fluoride is admitted from the tank 23. By means of the heating element 16 the barrel 11 is heated to a temperature sufficient to cause evaporation of aluminum chloride from the boat 12, the temperature being measured by the thermometer 19 and controlled in the usual manner by varying the electric current. The various adjustments necessary to introduce into the gas stream any desired proportions of the various constituents are readily determined by trial.

The gaseous mixture of decomposable compounds is carried through the burner tip 14 and are either hydrolyzed by water vapor in the products of combustion in the flame or otherwise decomposed to form a mixture of anhydrous oxides of silicon, boron and aluminum. The oxide mixture carried by the flame is deposited on the rotating lead-in wire 29 in a uniform layer and vitrified to a glass by the intense heat of the flame.

If desired, a tapered mandrel of nickel or other high melting, non-scaling metal or refractory material may be substituted in place of the lead-in wire 29 and the mixture of oxides is deposited on the mandrel but not vitrified thereon. After a layer of a few millimeters in thickness has thus been deposited, the product may be removed as a tubular pre-form and vitrified by means of an oxy-gas flame or other source of high temperature to form a glass tube. Lead-in wires are then coated with the glass by slipping a short section of the tube over the wire and fusing it thereto.

In lieu of the various decomposable compounds recited above, other suitable compounds may be substituted. For example, ethyl or methyl silicate, silicochloroform, silicon tetrafluoride and the like, may be substituted for silicon tetrachloride; methyl borate or boron hydride may be substituted for boron fluoride, etc. In case it is desired for any purpose to introduce small amounts of alkalies, second group oxides and other minor constituents, this may be done by employing in like manner decomposable compounds thereof which can be vaporized, particularly the organo metallic compounds.

By omitting the alumina constituent a glass composed only of silica and boric oxide may be deposited and vitrified in the same manner. Such compositions are useful for producing glasses having different softness-expansion relationships. The following table shows by way of illustration some glass compositions which we have deposited and vitrified upon lead-in wires by the above described process:

|  | I | II | III | IV | V | VI |
|---|---|---|---|---|---|---|
| $SiO_2$ | 82.9 | 78.2 | 68.4 | 86.6 | 89.7 | 68.3 |
| $B_2O_3$ | 14.4 | 20.7 | 20.2 | 11.7 | 10.3 | 31.7 |
| $Al_2O_3$ | 2.7 | 1.2 | 11.4 | 1.7 |  |  |
| $Exp./10^{-7}$ | 16 | 23 | 21 | 14 | 15 | 36 |

By suitable control of the amounts and proportions of the compounds introduced into the burner, the composition of the glass deposited upon the metal may be graded successively or continuously during deposition from compositions having relatively high expansion coefficients in contact with the metal to compositions of low expansion for sealing to silica. For seals of small size, such as are employed in the high pressure mercury arc lamps, we have found that a single composition having an expansion coefficient in the neighborhood of .0000015 suffices to form a successful seal between a tungsten lead-in wire of small diameter and silica.

We claim:

1. The method of making glass, which includes decomposing a gaseous mixture of glass forming compounds in a flame of combustible gas and vitrifying the resultant mixture of finely divided oxides.

2. The method of making glass, which includes passing through a high temperature flame a gaseous mixture containing decomposable compounds of silicon, boron and aluminum in predetermined proportions and depositing and vitrifying the resultant mixture of oxides.

3. The method of making glass, which includes introducing into the gas stream of a high temperature burner a gaseous mixture containing decomposable compounds of silicon, boron and aluminum in predetermined proportions, impinging the flame of the burner on a rotating refractory mandrel to deposit thereon an adherent deposit of the resultant oxide mixture and thereafter vitrifying the deposit.

4. The method of making glass, which includes introducing into the gas stream of a high temperature burner a gaseous mixture consisting of decomposable compounds of silicon, boron and aluminum in predetermined proportions, impinging the flame of the burner on a rotating refractory mandrel to deposit thereon an adherent deposit of the resultant oxide mixture and thereafter vitrifying the deposit.

5. The method of making glass, which includes introducing into the gas stream of a high temperature burner a gaseous mixture of silicon chloride, boron fluoride and aluminum chloride in predetermined proportions and depositing and vitrifying the resultant mixture of oxides.

6. The method of making glass, which includes introducing into the gas stream of a high temperature burner a gaseous mixture of silicon chloride, methyl borate and aluminum chloride in predetermined proportions and depositing and vitrifying the resultant mixture of oxides.

7. The method of coating a lead-in wire with glass, which includes decomposing a gaseous mixture containing glass-forming compounds in a flame of combustible gas, depositing the resultant mixture of oxides on a lead-in wire and vitrifying the deposit.

8. The method of coating a lead-in wire with glass, which includes passing through a high temperature flame a gaseous mixture containing decomposable compounds of silicon, boron and aluminum in predetermined proportions, depositing the resultant mixture of oxides on a lead-in wire, and vitrifying the deposit.

9. The method of coating a lead-in wire with glass, which includes introducing into the gas stream of a high temperature burner a gaseous mixture containing decomposable compounds of silicon, boron and aluminum in predetermined proportions, impinging the flame of the burner on a lead-in wire to deposit thereon the resultant mixture of oxides and at the same time vitrifying the deposit.

10. The method of coating a lead-in wire with glass, which includes introducing into the gas stream of a high temperature burner a gaseous mixture consisting of decomposable compounds of silicon, boron and aluminum in predetermined proportions, impinging the flame of the burner on a lead-in wire to deposit thereon the resultant mixture of oxides and at the same time vitrifying the deposit.

11. The method of coating a lead-in wire with glass, which includes introducing into the gas stream of a high temperature burner a gaseous mixture containing decomposable compounds of silicon, boron and aluminum in predetermined proportions, impinging the flame of the burner on a rotating refractory mandrel to deposit thereon an adherent deposit of the resultant oxide mixture, vitrifying the deposit to form a tube of glass, placing the tube on a lead-in wire and fusing the glass thereto.

12. The method of making a glass to metal seal, which includes decomposing a gaseous mixture containing glass-forming compounds in a flame of combustible gas, depositing the resultant mixture of oxides upon a metal article to be sealed therewith and fusing the deposit on the metal.

13. The method of making a graded seal of glass which includes passing through a high temperature flame a gaseous mixture containing decomposable glass-forming compounds in predetermined proportions, depositing the resultant mixture of oxides upon an article to be sealed therewith, varying the proportions of the compounds to successively change the composition of the deposit and vitrifying the deposit and fusing it on the article.

14. The method of making a uniformly graded seal between metal and glass, which includes passing through a high temperature flame a gaseous mixture containing decomposable glass-forming compounds in predetermined proportions, depositing the resultant mixture of oxides upon a metal article to be sealed therewith, at the same time vitrifying the deposit to form a glass and regularly changing the proportions of the compounds to continuously vary the expansion coefficient of the glass.

ROBERT H. DALTON.
MARTIN E. NORDBERG.